Jan. 17, 1950     C. P. PEPPER     2,494,960

MOTOR-GENERATOR-STARTER DRIVE UNIT

Filed March 31, 1948

INVENTOR
CARL P. PEPPER
BY
ATTORNEY

Patented Jan. 17, 1950

2,494,960

UNITED STATES PATENT OFFICE 2,494,960

MOTOR-GENERATOR-STARTER
DRIVE UNIT

Carl P. Pepper, Plainfield, Ind., assignor to L. G. S. Spring Clutch Corporation, Indianapolis, Ind., a corporation of Indiana Application March 31, 1948, Serial No. 18,100

7 Claims. (Cl. 74—810)

The invention relates to a gear and clutch unit, the illustrative design of the accompanying drawing being for use as an aircraft engine starter two-way-driving connection between an armature shaft of a motor-generator and an engine part such as a crank-shaft-coupled gear.

The illustrated unit, as one function, enables the motor-generator (when acting to crank and start the engine) to operate through a speed-reduction gearing for relatively slow output speed and, as another function, (when acting as the engine-generator coupling) enables the engine crank-shaft-coupled gear to act independently of the reduction gearing or through one element only thereof, e. g. the starter pinion in mesh with the engine gear, to drive the motor-generator within a desirable speed range for battery charging and electrical power supply to various mechanisms in the craft served. The speed reduction gearing may incorporate an emergency slip clutch for anti-backfire protection of the electrical apparatus. The above indicates the principal objects.

A further object is to provide an improved two-directional drive clutch and gear mechanism for purposes such as already mentioned, wherein a spring clutch functions automatically and alternately, depending upon the direction of power flow through the mechanism, to cause, for example, constant mesh gearing of the mechanism to be rendered operative in one case and be rendered idle or shunted out of effective operation in another.

Another object is to provide a mechanism such as just outlined having substantially minimum overrunning drag of the clutch spring regardless of the direction of power flow through the mechanism.

Figure 1:
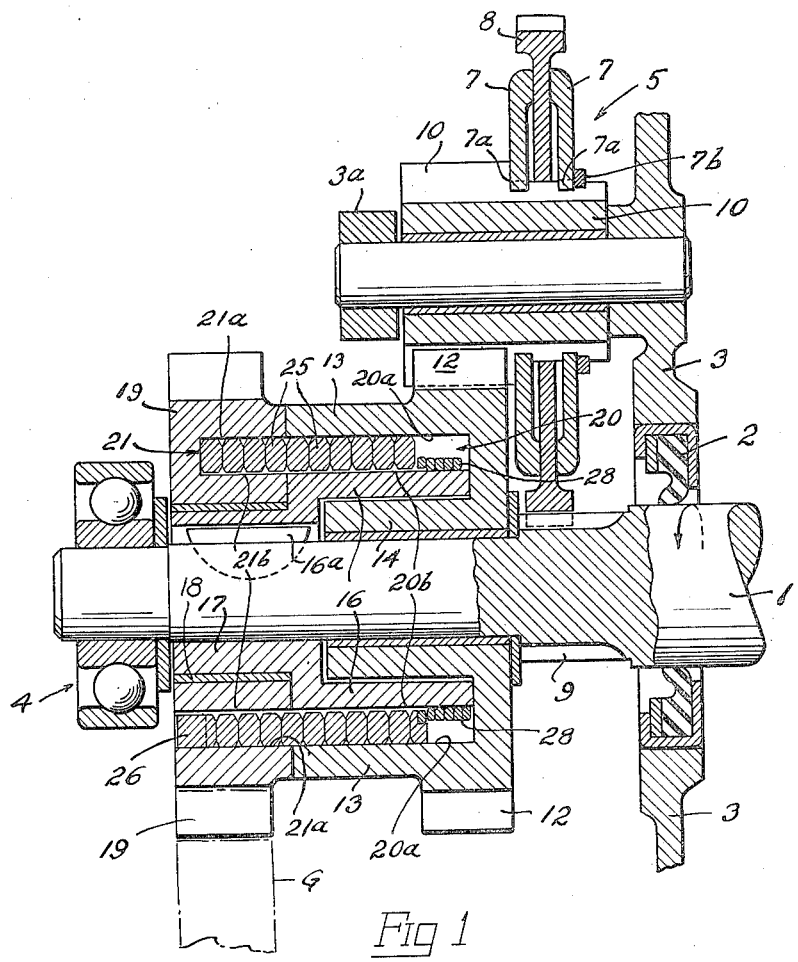
Figure 2:
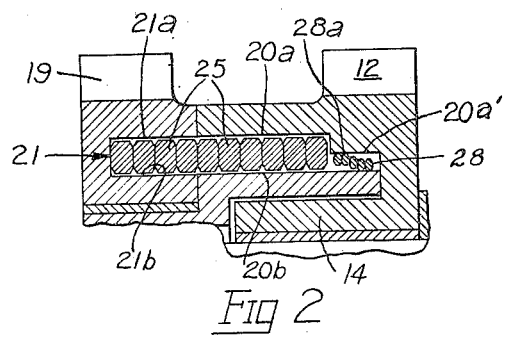

Other objects will become apparent from the following description of the exemplary assembly shown in Fig. 1 in longitudinal central section and in somewhat enlarged scale. Fig. 2 is a fragmentary detail longitudinal sectional view of a modified construction.

The member 1, Fig. 1, represents an end portion of the motor-generator armature shaft arranged to turn in the direction indicated by the arrow thereon in starting the aircraft engine, the latter being represented only by a diagrammatic indication G of a portion of a gear suitably connected to the crank shaft. The shaft 1 extends through an oil seal assembly 2 in a portion 3 of the engine housing to a fixed anti-friction bearing 4 also suitably supported by the housing. A jack shaft gearing assembly 5 is mounted in the housing portions 3 and 3a at one side of the armature shaft and includes the emergency slip clutch assembly in the form of spring-friction discs 7 embracing the friction surfaced web portion of a gear wheel 8 in constant mesh with a small diameter pinion 9 integral with the armature shaft, and a relatively small jack shaft gear 10 splined to the clutch discs at 7a. The web of the gear 8 is journalled on the peripheral faces of the spline teeth for rotation relative to the clutch discs 7 and gear 10. The discs 7 may be held onto the gear 10 by means of a snap ring 7b to retain approximately the desired backfire release pressure. The gear 10 is in constant mesh with a gear 12 having a clutch drum portion 13 and, spaced inwardly therefrom, a hub 14 journalled for free rotation as by a bearing sleeve 15 around the armature shaft.

A clutch drum member 16 occupies the circular space between the drum 13 and hub 14; and the reduced diameter hub 17 of said member 16 extends to the left of the drum proper and is keyed to the armature shaft at 16a. The hub 17 carries a bearing journal sleeve 18 for the starter pinion or gear 19 which has a double-clutch-drum-forming pocket 21 aligned with and contiguous to a complementary clutch drum pocket 20 formed between the drums 13 and 16. The pockets are of the same internal and external diameter and are defined principally by a coacting pair of internal clutch drum surfaces 20a and 21a on the members 13 and 19 respectively and coacting paired external drum surfaces 20b and 21b on the members 16 and 19 respectively.

When the armature shaft 1 is the driving member torque is transmitted from the internal drum 13 of the gear 12 through a driving clutch spring 25 wound as a left hand helix and having at its left end a toe or lug 26 or other suitable means for anchoring the clutch spring to the starter pinion or gear 19 so that the clutch spring is always forced to turn with the starter pinion whenever the latter is turning. The clutch spring has gripping surfaces internally and externally of its coils and the normal or unstrained diameter of the spring may be such that the external gripping surface of all the coils is slightly larger than the internal pocket surfaces 20a and 21a, thus illustrating one manner in which the clutch spring is made self-energizing to connect the gears 12 and 19 for rotation in the starting direction indicated by the arrow on the shaft 1. If the starter pinion 19 is acting as a driving member of the unit and is turned in that same direction then the gear 12 by reason of the direction in which the clutch spring is wound is released by the clutch spring.

Suitably attached to the otherwise free, right hand end of the clutch spring 25 is a relatively light gage teaser or energizer clutch spring 28 of the type shown by the patent to W. C. Starkey 1,932,000 and capable of functioning in the manner of the teaser spring disclosed in that patent. The teaser spring 28 has its coils left hand wound and with its inner clutching surfaces in interference fitting relation to the drum surface 20b of the drum 16 which turns with the armature shaft 1. Because of the direction of winding of the teaser spring, assuming the drum 16 is turned by the armature shaft through the reduction gearing 9, 8, 10, 12 in the indicated engine-starting direction and slower than the armature shaft speed, the teaser spring is overrun by the drum 16 wherefore the teaser is then incapable of causing any radial movement of the main clutching coils. The overrunning motion of the drum surface 20b merely tends to expand the teaser hence the main clutching coils. On the other hand, if the gear 19 becomes the driving member (same direction of rotation as before) the clutch spring 25 has an overrunning action against the internal drum surface 20a of the drum 13 of gear 12 tending to release the clutch coupling through surfaces 21a and 20a but the teaser spring has a contracting or gripping action on the surface 20b of the drum 16. Thereupon because of the inertia of the armature shaft the teaser spring initiates contraction of the main clutch spring 25 onto the external drum surface 20b of the armature shaft drum 16 causing it to wrap down and grip said drum 16 to establish a one-to-one ratio coupling of the starter gear and armature shaft, shunting the reduction gearing out of operation. Since the main clutch spring becomes entirely freed from the internal drum surface 20a of the gear 12 the gears 8, 10 and 12 rotate very freely being substantially unloaded.

Thus when the armature shaft 1 is rotated by the motor-generator to start the engine, the gear train is automatically and instantly conditioned for operation primarily by the energizing action produced by the overrunning drag of the teaser spring on drum surface 20b assisted by the tendency for the spring 25 to become self-energized in its expanding clutching action. During the relatively short engine-starting period the light gage teaser spring has relatively light dragging pressure on the more rapidly turning armature-connected drum 16. After the engine takes over and drives the armature shaft at the desired comparatively high speed due to the usual speed-increasing relationship of gears G and 19, for efficient action of the motor generator to supply current, then all overrunning drag of the entire clutch spring assembly (hence all tendency to generate heat and wear) is removed by the action of the light teaser spring 28 in automatically initiating contraction of the main clutch spring 25 onto the drum surfaces 20b and 21b. The period of operation of the motor-generator after starting the engine is all but a small percentage of the entire period of operation of the mechanism.

In Fig. 2, showing portions of the same assembly as described above similarly numbered, the heavy duty coils 25 which lie between the drums 13 and 16 are, in their unstrained condition (i. e. when not subjected to torque), out of contact with both those drums whereby the heavy duty coils never have any overrunning drag regardless of the direction of power flow through the mechanism. Instead of providing light interference fit of the heavy duty coils 25 against drum surface 20a the clutch spring is made self-energizing in the engine-starting direction of operation by enlargement of one or more of the light duty teaser or energizer coils (e. g. coils 28a) so as to bear with clutch-energizing pressure on the drum surface 20a or on an equivalent reduced diameter surface portion 20a' (Fig. 2 only). The coil or coils 28a normally bear on the surface 20a' with sufficient force to make certain of unwrapping or expansion of the clutching coils 25 into clutching contact with the surface 20a in the engine-starting direction of operation of the mechanism. When the engine gearing G-19 takes over, the coils 28, by reason of their permanent light contact with the surface 20b, cause contraction of the teaser coils 28a as well as the clutching coils 25 out of contact with the drum 13.

I claim:

1. A two-way driving gear and clutch mechanism comprising two torque-transmitting members alternately active as driving and driven members, a gear train arranged to connect the members for power flow through the mechanism in one direction and including a helical spring clutch assembly comprising concentric internal and external drums and a clutch spring between the drums, said spring being automatically actuated to cause it drivingly to engage one of the drums for power flow through the gear train in said direction, clutching coil surfaces of the spring being normally out of engagement with the other drum but adapted clutchingly to engage the same, a permanent direct driving connection between the clutch spring and one of said members, a permanent direct driving connection between said other drum and the other of said members, and a relatively light-pressure clutch-spring-energizing permanent friction connection between the clutch spring and said other drum operative automatically to initiate deenergization of the clutch spring from said one drum and concurrently to initiate energization of the clutch spring for clutching connection with said other drum for power flow through the mechanism in the opposite direction in shunting relation to the gear train.

2. The mechanism according to claim 1 wherein the clutch spring comprises a series of clutching coils of relatively large cross section normally in interference fitting relation to said one of the drums, and the light-pressure connection is an extension of said series and of relatively small cross section yieldingly in interference fitting relation to said other drum.

3. The mechanism according to claim 1 wherein the clutch spring comprises a series of heavy duty clutching coils of relatively large cross section normally in non-driving relation to both drums and two interconnected light duty energizing coil portions respectively in permanent light friction contact with said drums.

4. In a clutch mechanism arranged for power flow alternately in opposite directions therethrough, two relatively rotatable concentric drums providing peripheral clutching surfaces radially spaced apart, means continuously connecting the drums for relative rotation but so that both drums turn in the same direction, a rotary driving/driven member concentric with the drums for transmitting such alternate power flow, a helical clutch spring with relatively heavy duty clutching coils arranged for driving contact alternately with the drums and permanently connected to said rotary member, said clutching coils having an energizing coil portion normally in relatively light energizing contact with one of the drums, and an energizing coil portion operatively integral with the clutching coils and permanently in relatively light energizing contact with the other drum whereby release of the clutching coils from either drum and reconnection of the same coils with the other drum results from reversal of power flow in either direction.

5. In a clutch mechanism arranged for power flow alternately in opposite directions therethrough, two relatively rotatable concentric drums providing peripheral clutching surfaces radially spaced apart, means continuously connecting the drums for relative rotation but so that both drums turn in the same direction, a rotary driving/driven member concentric with the drums for transmitting such alternate power flow, a relatively heavy duty helical clutch spring portion permanently connected at one end to said rotary member for alternate gripping contact with the drums, said spring portion having a terminal coil portion normally in energizing pressure clutching contact with one of the drums, and an energizing friction spring coil portion of relatively small cross section spring stock continually connected to said terminal coil portion and permanently in yielding pressure energizing contact with the other drum for initiating release of the heavy duty spring coils from said one drum and reconnecting said coils to the other drum consequent upon such reversal of power flow.

6. A two-way driving gear and clutch mechanism comprising two torque-transmitting members alternately active as driving and driven members, a gear train arranged to connect the members for power flow through the mechanism in one direction and including a spring clutch assembly comprising two substantially contiguous concentric drums and a helical clutch spring bridging the same and which is self-energizing to connect the drums for co-rotation, two other substantially contiguous drums concentric with and radially opposite respective ones of the first two drums and arranged to be engaged by the clutch spring, said other two drums being drivingly connected respectively with said members in power shunting relation to the gear train, and a relatively light-pressure clutch-spring-energizing permanent friction connection between the clutch spring and one of the second mentioned two drums and operative automatically to initiate deenergization of the clutch spring from one of the first mentioned two drums and concurrently to initiate energization of the clutch spring for clutchingly connecting the second two drums when power flow through the mechanism is reversed.

7. A two-way-operating, motor-generator-engine-starter drive of the class described, comprising a rotary member adapted for co-rotative connection to a motor-generator rotor and having a clutch drum thereon, another clutch drum concentric therewith radially spaced therefrom and connected thereto by speed reduction gearing, a starter gear concentric with the two drums, a helical clutch spring co-rotatively connected to the starter gear and having clutching coils in such radial space normally energized for clutching contact with said other clutch drum, energizing means on the free end of said clutch spring in relatively light pressure overrunning dragging contact with the first mentioned drum when said rotary member is driving the starter pinion through the reduction gearing, said energizing means acting to initiate radial movement of the clutch spring into gripping relationship with the first mentioned drum and out of gripping relation to the second when the starter pinion overruns the rotary member.

CARL P. PEPPER.

REFERENCES CITED

The following references are of record in the file of this patent:

UNITED STATES PATENTS

| Number | Name | Date |
|---|---|---|
| 1,084,577 | Halbleib | Jan. 13, 1914 |
| 1,320,460 | Ellett | Nov. 4, 1919 |
| 2,219,877 | Starkey | Oct. 29, 1940 |

FOREIGN PATENTS

| Number | Country | Date |
|---|---|---|
| 687,056 | France | Apr. 22, 1930 |